United States Patent [19]

Clodfelter et al.

[11] 4,137,351
[45] Jan. 30, 1979

[54] FILAMENT/EPOXY CAMOUFLAGE LAUNCH TUBES

[75] Inventors: Glen A. Clodfelter, Madison; Ocke C. Fruchtnicht, Huntsville, both of Ala.

[73] Assignee: The United States of America as represented by the Secretary of the Army, Washington, D.C.

[21] Appl. No.: 892,542

[22] Filed: Apr. 3, 1978

[51] Int. Cl.² .................. F41F 17/08; F16L 9/12; F41F 3/04

[52] U.S. Cl. .................. 428/36; 42/76 A; 89/16; 428/113; 428/195; 428/196; 428/377; 428/418; 428/919

[58] Field of Search .................. 428/36, 35, 919, 418, 428/113, 377, 195, 196; 89/16, 1.816, 36R; 42/76 A

[56] References Cited

U.S. PATENT DOCUMENTS

| | | | |
|---|---|---|---|
| 2,847,786 | 8/1958 | Hartley | 42/76 A |
| 2,901,455 | 8/1959 | Jurras | 89/16 R |
| 2,935,913 | 5/1960 | Wilson | 42/76 A |
| 3,160,060 | 12/1964 | Zsoka | 89/1.816 |
| 3,298,279 | 1/1967 | Barnet | 42/76 A |
| 3,517,585 | 6/1970 | Slade | 89/16 R |
| 3,571,962 | 3/1971 | Eig | 89/16 R |
| 3,700,397 | 10/1972 | Ramsley | 428/919 |
| 3,868,613 | 2/1975 | Rogers, Jr. | 428/418 |
| 3,916,759 | 11/1975 | Jones | 89/1.816 |

Primary Examiner—Ellis P. Robinson
Attorney, Agent, or Firm—Nathan Edelberg; Robert P. Gibson; James T. Deaton

[57] ABSTRACT

Filament/epoxy camouflage launch tubes in which the launch tubes are fabricated using conventional filament winding processes and materials and in which each tube is bonded together with an epoxy resin system in which the epoxy resin system includes coloring agents for coloring the launch tubes in a camouflage color that colors the launch tube through and through. The exact color of the launch tube can be varied by varying the amount of the coloring agent.

4 Claims, 1 Drawing Figure

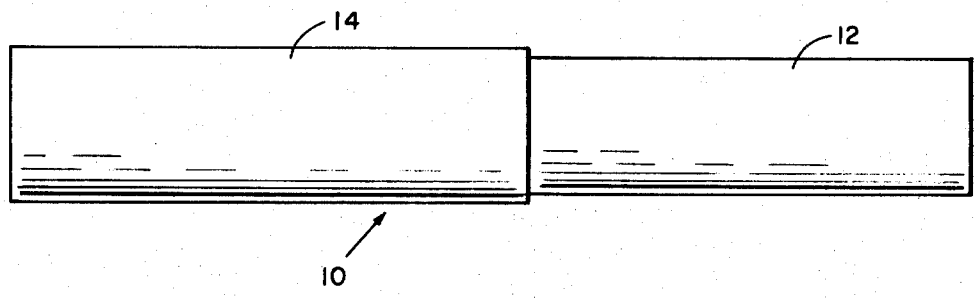

FILAMENT/EPOXY CAMOUFLAGE LAUNCH TUBES

The invention described herein may be manufactured, used, and licensed by or for the Government for governmental purposes without the payment to us of any royalties thereon.

BACKGROUND OF THE INVENTION

In the past, problems have arisen in coloring of the launch tube in a camouflage color. These problems have resulted from painting of the outer surface of the launch tube. When the launch tube is scratched or scarred, the camouflage color is removed and the launch tube is no longer camouflaged as desired.

Therefore, it is an object of this invention to provide a camouflage launch tube in which the camouflage color is throughout the launch tube structure.

Another object of this invention is to provide a lightweight launch tube which has a camouflage color therethrough.

Other objects and advantages of this invention will be obvious to those skilled in this art.

SUMMARY OF THE INVENTION

In accordance with this invention, a filament/epoxy camouflage launch tube is provided in which the launch tube is made by filament winding of the launch tube and by applying an epoxy resin system that has the appropriate coloring agent therein to color the launch tube as it is being wound. After winding, the launch tube is cured in a conventional manner.

BRIEF DESCRIPTION OF THE DRAWING

The single FIGURE of the drawing is a view of a launch tube in accordance with this invention.

DESCRIPTION OF THE PREFERRED EMBODIMENT

Referring now to the drawing, a launch tube 10 in accordance with this invention is illustrated that includes an inner tube 12 and an outer tube 14. Tubes 12 and 14 are fabricated in a conventional manner by a filament winding process that can be accomplished on various types of commercially available winding machines. Outer tube 14 that has been found to work successfully in accordance with applicants' invention has nominal dimensions of an inside diameter of 2.913 inches, wall thickness of 0.032 inches, and a length of 19.75 inches. These dimensions can vary depending upon the needs of the missile system in which they are used. Outer tube 14 has four layers of filament/epoxy material in which each layer is comprised of two plies of filament/epoxy wound at opposite winding angles of ±70° at 14 rovings/inch.

Inner tube 12 is similar to outer tube 14 except that inner tube 12 contains only three layers of filament/epoxy material. The filament used in the tubes is commercially obtainable glass fibers with 12 end roving on roving balls with outside spooling.

The epoxy system used in fabricating inner and outer tubes 12 and 14 consists of epoxy, hardener, accelerator and two coloring agents. The epoxy is conventional commercially curable epoxy such as those sold by Shell Chemical Company or by others. The coloring agents must be of materials that do not loose or change color when curing of the tubes in order to control the desired camouflage color desired.

SPECIFIC EXAMPLE

The compounds listed below are mixed in the following proportions (by weight) to obtain an epoxy system for fabricating both inner and outer tubes 12 and 14:

800 parts - epoxy - diglycidyl ether of bisphenol A
720 parts - hardener - methyl bicyclo[2.2.1]heptane-2,3-dicorboxylic anhydride isomers or Nadic Methyl Anhydride
8 parts - accelerator - N,N-dimethylbenezylamine
1 part - coloring agent - carbon black
11 parts - coloring agent - yellow iron oxide The coloring agents make up the pigments for coloring the tubes and the pigments can comprise between about 0.5 and about 2.0 percent by weight of the epoxy resin system. The coloring agent carbon black can vary in parts from about 1 to about 3 parts and the coloring agent yellow iron oxide can vary from about 8 to about 11 parts. Even though specific epoxy, specific hardener, and specific accelerator have been disclosed, other epoxy, hardener, and accelerator can be used in the epoxy system in accordance with this invention.

Tubes 12 and 14 are polymerized (hardened) in a conventional manner in accordance with the manufacturers recommendation for the specific resin. For example in the specific example listed above, the tubes are cured for seven hours at 200° F. then 16 hours at 400° F. The resulting cured tubes 12 and 14 in accordance with this invention are a dark olive drab color when cured and have an approximate resin content of 21.5 ± 1.5 percent (by weight). The color of the tubes can be altered or varied by varying the amounts of the coloring agents as noted supra. The coloring agents are mixed with the other ingredients of the epoxy system and applied to the glass fibers just prior to the fibers being wound into the tubes to provide the tube structure. With this structure, the tubes are colored the same color throughout and scratches or bumps on the tubes do not interfere with the coloring of the tubes in a camouflage color. Tubes 12 and 14 made in accordance with this invention are lightweight, disposable, inexpensive and each of the tubes have minimum physical dimensions. Since the launch tubes comprise the bulk of a launcher, the parameters listed above are directly applicable to the launch tubes as design parameters.

We claim:

1. A cured camouflage launch tube comprising a wound glass fiber structure that is secured together with an epoxy resin system and with coloring agents in the epoxy resin system to color the launch tube the same camouflage color throughout the entire wall thickness, said coloring agents being carbon black and yellow iron oxide and possesses thermal and color stability under the resin curing conditions.

2. A camouflage launch tube as set forth in claim 1, wherein said coloring agents comprise between about 0.5 and about 2 weight percent of said epoxy resin system.

3. A camouflage launch tube as set forth in claim 2, wherein said epoxy resin system consists of about 800 parts by weight of an epoxy resin, about 720 parts by weight of a hardener, about 8 parts by weight of an accelerator, about 11 parts by weight of the coloring agent yellow iron oxide and about 1 part by weight of the coloring agent carbon black.

4. A camouflage launch tube as set forth in claim 3, wherein said epoxy resin is diglycidyl ether of bisphenyl A, wherein said hardener is methylbicyclo-[2.21]heptene-2,3-dicorboxylic anhydride isomers and wherein said accelerator is N,N-dimethylbenezylamine.

* * * * *